United States Patent
Winter

[15] 3,697,520
[45] Oct. 10, 1972

[54] TRIAZINE CARBOXYLIC ACIDS AND ESTERS
[72] Inventor: Roland A. E. Winter, Armonk, N.Y.
[73] Assignee: Ciba-Geigy AG, Basel, Switzerland
[22] Filed: April 30, 1970
[21] Appl. No.: 33,527

[52] U.S. Cl. ............................................... 260/249.6
[51] Int. Cl. .............................................. C07d 55/22
[58] Field of Search ................................... 260/249.6

[56] References Cited
UNITED STATES PATENTS
3,536,709   10/1970   Heimberger ............ 260/249.6

Primary Examiner—John M. Ford
Attorney—Karl F. Jorda and Nestor W. Shust

[57] ABSTRACT

Triazine carboxylic acids and esters are useful as starting materials in the preparation of high temperature polymers, antioxidants and plastercizers.

These compounds are prepared by reacting cyanuric chloride or an amino substituted dichloro-s-triazine with amino acids or amino esters in the presence of a base and water.

12 Claims, No Drawings

TRIAZINE CARBOXYLIC ACIDS AND ESTERS

DETAILED DESCRIPTION

This invention relates to novel triazine carboxylic acids and esters and to methods for preparing them.

The compounds of the present invention are represented by the following formula:

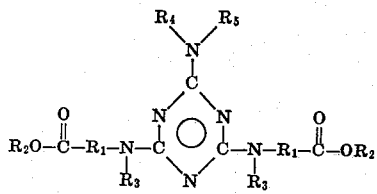

wherein:

$R_1$ is a phenylene, alkylene or cycloalkylene hydrocarbon group, of 10 or less carbon atoms;

$R_2$ is aryl, lower alkyl or hydrogen;

$R_3$ is hydrogen or alkylene monocarboxylic acid; and $R_4$ and $R_5$ are the same or different and each is hydrogen, alkenyl, alkyl, aryl or cycloalkyl hydrocarbon group of six or less carbon atoms.

The lower alkyl groups employed herein are straight or branched chain alkyl groups having up to six carbon atoms. Examples of such groups are methyl, ethyl, propyl, isopropyl, butyl, tert-butyl, pentyl, hexyl and the like.

The preferred embodiments of this invention include the compounds wherein:

$R_1$ is an alkylene group of from one to 10 carbon atoms such as methylene, ethylene, propylene, hexylene, decylene, isobutylene, 3-methylhexylene and the like; an ortho, meta or para substituted phenylene group; or a cycloalkylene group such as cyclopentylene, cyclohexylene and the like.

$R_2$ is a phenyl group; a lower alkyl group as described previously; or hydrogen.

$R_3$ is hydrogen; or the group $C_xH_{2x}COOH$ wherein $x$ has the value from 1 to 10 such as methylene carboxylic acid, ethylene carboxylic acid, pentylene carboxylic acid, octylene carboxylic acid, 3-methylhexylene carboxylic acid and the like.

$R_4$ and $R_5$ are independently an alkyl group of up to six carbon atoms such as methyl, ethyl, propyl, butyl, hexyl and the like; a cycloalkyl group such as cyclopentyl and cyclohexyl; a pentyl group; an allyl group; or hydrogen.

The group $NR_4R_5$ as shown in the above formula will hereinafter be referred to as the amino blocking group. Illustrative examples of the amino blocking groups are —$NH_2$, diphenylamino, dimethylamino, diethylamino, dipropylamino, diisopropylamino, anilino, N-methylanilino, N-ethylanilino, N-pentylanilino and the like.

Illustrative examples of the diacid and diester-s-triazine compounds of this invention are:

2-dimethylamino-4,6-bis(5'-carboxy-n-pentylamino)-s-triazine 2-dimethylamino-4,6-bis(2'-carboxyethylamino)-s-triazine 2-dimethylamino-4,6-bis(carboxymethylamino)-s-triazine 2-dimethylamino-4,6-bis(o-carbomethoxyanilino)-s-triazine 2-dimethylamino-4,6-bis(10'-carboxy-n-decylamino)-s-triazine 2-diethylamino-4,6-bis(5'-carboxy-n-pentylamino)-s-triazine 2-diethylamino-4,6-bis(p-carbomethoxyanilino)-s-triazine 2-diphenylamino-4,6-bis(5'-carboxy-n-pentylamino)-s-triazine 2-diphenylamino-4,6-bis(p-carbethoxyanilino)-s-triazine 2-diphenylamino-4,6-bis(m-carbomethoxyanilino)-s-triazine 2-diphenylamino-4,6-bis(p-carbomethoxyanilino)-s-triazine 2-diphenylamino-4,6-bis(p-carbophenoxyanilino)-s-triazine methylphenylamino-4,6-bis(5'-carboxy-n-pentylamino)-s-triazine 2-diallylamino-4,6-bis(5'-carboxy-n-pentylamino)-s-triazine 2-amino-4,6-bis(5'-carboxy-n-pentylamino)-s-triazine 2-dimethylamino-4,6-bis[di(carboxymethyl)amino]-s-triazine 2-dimethylamino-4,6-bis[di(carboxymethyl amino]-s-triazine 2-dimethylamino-4,6-bis(5'-carboxy-n-propylamino)-s-triazine.

The general method of preparing the above mentioned compounds is by reacting cyanuric chloride or an amino substituted dichloro-s-triazine with amino acids or amino esters in the presence of base and water over the temperature range of from 0° to 100° C.

More specifically the compounds of this invention can be prepared in essentially two methods as indicated below:

Method 1 — First the amino blocking group is introduced on the triazine nucleus by reacting cyanuric chloride with the appropriate amino compound at a temperature of 0° to 10° C and in the presence of a base. This is a generally known reaction as described by Thurston et al., J. Am. Chem. Soc., 73, 2992 (1951). The second step comprises reacting the intermediate amino substituted dichloro-s-triazine with an amino acid or an amino ester which results in replacing the two chloro groups with the amino acid or amino ester groups. The latter reaction is conducted in boiling water in the presence of a base.

Method 2 — In this method the two amino acid or ester groups are substituted on the triazine nucleus first and then the blocking group is introduced on the nucleus. This is accomplished by reacting cyanuric chloride with an appropriate amino acid or ester at a temperature of 30° – 60° C and preferably 40° – 60° C. Thereafter the product from the first reaction is reacted with the amino compound containing the desired blocking group. This reaction is carried out at reflux in an aqueous medium in the presence of a base. In the above mentioned reactions requiring a base such bases as sodium or potassium hydroxides or sodium carbonate can be advantageously employed.

It is frequently convenient to prepare the amino acid salts used above in situ by base hydrolysis of the corresponding lactams, e.g., ε-caprolactam.

Although the preparation of the triazine amino acid derivatives can be carried out either in water or in organic solvents, the water medium is preferred. Since the salts of the triazine amino acids are soluble in water, the progress of the reaction can be following by monitoring the disappearance of the insoluble cyanuric chloride or amino substituted dichloro triazine starting materials from the aqueous solutions. The separation and purification step is also made more efficient since the insoluble unreacted triazine based starting materials can be filtered out of the solution at the completion of the reaction. Upon acidifying the filtered solution the product preciptates. The unreacted amino acids and salts formed during the reaction remain in the aqueous phase.

In preparing the triazine amino esters, organic solvents are preferred as the reaction medium. Organic solvents suitable for this purpose include dioxane, toluene, tetrahydrofuran and the like.

The diaryl esters such as 2-diphenylamino-4,6-bis(p-carbophenoxyanilino)-s-triazine are preferably prepared by an ester exchange reaction of a corresponding dialkylester such as 2-diphenylamino-4,6-bis(p-carbomethoxyanilino)-s-triazine, with phenol in the presence of a catalyst such as $Ti(OBu)_4$ or $NaOCH_3$.

The compounds of this invention can be used as intermediates in making high temperature polymers such as polyesters, polyamides, polybenzimidazoles and polybenzoxazoles. These compounds can also serve as intermediates in preparing antioxidants and plasterizers.

The following examples illustrate the invention.

EXAMPLE I 4,6-Bis(5'-carboxy-n-pentylamino)-2-dimethylamino-s-triazine

In a reaction vessel equipped with a stirrer, a reflux condenser and a thermometer, a mixture of 181 g of ε-caprolactam, 420 ml of water and 251.5 g of 50.9 percent aqueous sodium hydroxide solution was heated at reflux for 2 hours. The solution was cooled to room temperature and 154.4 g of solid 4,6-dichloro-2-dimethylamino-s-triazine together with 1,000 ml of water were added slowly thereto. The resulting suspension was stirred at room temperature overnight and then heated at reflux for 2 hours. Ten grams of charcoal was added to the hot solution which was filtered the filtrate acidified to pH 3 by the addition of concentrated hydrochloric acid. After standing overnight the precipitated white crystalline solid was washed with water and dried. Yield 267.6 g (88 percent); mp. 186°–187° C.

Analysis:
Calcd. for
$C_{17}H_{30}N_6O_4$ (382.46): C: 53.50; H: 7.29; N: 22.00
Found: 52.81   7.47   21.97
       53.25   7.91   22.40
       53.11   7.76   21.92

EXAMPLE 2

4,6-Bis(2'-carboxyethylamino)-2-dimethylamino-s-triazine

To a slurry of 96.5 g of 4,6-dichloro-2-dimethylamino-s-triazine in 1,000 g of ice water was added 500 ml of an aqueous solution containing 106.9 g of β-alanine and 172 g of 51.2 percent sodium hydroxide over a 1 hour period while the temperature was maintained below +30° C. The mixture was stirred at room temperature for 17 hours and then heated at reflux for 2 hours. The pH was adjusted to 3.0 by addition of 20 percent sulfuric acid. The resulting suspension was filtered and washed with water. The product was dried yielding 121.6 grams (82 percent) of the product, mp. 285°–287° C.

Analysis:
Calcd. for
$C_{11}H_{18}N_6O_4$ (298.30): C: 44.29; H: 6.08; N: 28.18
Found:                        43.76   6.07      28.18
                              44.02   5.89      28.18

EXAMPLE 3

4,6-Bis(carboxymethylamino)-2-dimethylamino-s-triazine

To a suspension of 96.5 g of 4,6-dichloro-2-dimethylamino-s-triazine in 1,000 ml of water/ice slush was added over a 30 minute period a solution containing 90 g of glycine, 172 g of 51.2 percent NaOH solution and water, total volume 350 ml. The suspension was stirred overnight and the resulting solution was heated at 85° for 1½ hours and then refluxed for 1 additional hour. The hot solution was acidified with sulfuric acid to pH 3.0, the suspension was stirred for 1 hour, filtered and washed with water. The wet (204 g) product was dried yielding 115.5 g of white 4,6-di(carboxymethylamino)-2-dimethylamino-s-triazine, mp. decomp. 284°. Yield 85.5 percent.

Anaysis:
Calcd. for
$C_9H_{14}N_6O_4$ (270.25): C: 40.00 H: 5.22, N: 31.10
Found:                          39.71,   5.11,      31.04
Neutralization Eqv:   Calcd:   135.1
                      Found:   136.0, 136.8

EXAMPLE 4

4,6-Bis(o-carbomethoxyanilino)-2-dimethylamino-s-triazine

A reaction vessel equipped with a stirrer and a reflux condenser connected to a bubble tube to monitor gas evolution was charged with 28.9 g of 4,6-dichloro-2-dimethylamino-s-triazine, 54.5 g of freshly distilled methyl anthranilate (bp 64° at 0.05 m m Hg;), 42.4 g of powdered anhydrous sodium carbonate and 600 ml of toluene. The mixture was then heated at reflux with stirring for 70 hours. The hot mixture was filtered and the residue was washed with toluene. The product crystallized overnight in a refrigerator. The crystals were filtered, washed with ethanol and dried, yielding 39.5 g (62 percent) of the product m.p. 172°–173° C.

Analysis:
Calcd for
$C_{21}H_{22}N_6O_4$ (422.4):   C: 59.70   H: 5.25   N: 19.90
                                           5.29 5.59 19.87

EXAMPLE 5

2-Dimethylamino-4,6-bis(10'-carboxy-n-decylamino)-s-traizine

A reaction flask was charged with 40.2 g 11-aminoundecanoic acid, 16 g of sodium hydroxide and 500 ml of water. Then 19.3 g of 2-dimethylamino-4,6- dichloro-s-triazine was added, the mixture stirred overnight at room temperature and then refluxed for 2 hours. After cooling 16.7 ml of hydrochloric acid was added and the precipitated product was recrystilized from acetic acid yielding 42.7 g (82 percent) of the product which, after recrystallization from acetic acid-water mixture had a melting point of 146.5° – 148° C.

Analysis:
Calcd for
$C_{27}H_{50}N_6O_4$        C: 62.04    H: 9.64    N: 16.08
                            62.13       9.76       16.07

EXAMPLE 6

4,6-Bis(5'-carboxy-n-pentylamino)-2-diethylamino-s-triazine

To a solution of 181 g of ε-caprolactam in 500 ml of water was added 250 g of 51.2 percent aqueous sodium hydroxide solution in a reaction flask equipped with a stirrer, a reflux condenser and a thermometer. The mixture was heated at reflux for 2 hours. The resulting solution was cooled to room temperature and 177 g of solid 4,6-dichloro-2-diethyl-amino-s-triazine and 1,000 ml of water were added. The mixture was then refluxed for four hours and thereafter charcoal was added to the hot solution. After stirring the mixture was filtered and the hot filtrate was acidified to pH 3 with conc. hydrochloric acid. After standing overnight the precipitated white product was filtered and washed with water. The diacid was dried, yielding 272.0 g of the product (83 percent); m.p. 170°–171° C.

Analysis:
Calcd. for
$C_{19}H_{34}N_6O_4$ (410.51) C:    55.59; H: 8.35,   N:    20.4
Found:                              55.23       8.43        20.5
                                    55.00       8.34        20.5

EXAMPLE 7

2-Diethylamino-4,6-bis(p-carbomethoxyanilino)-s-triazine

I. A reaction flask fitted with a stirrer, a thermometer, a condenser and a gas dispersion tube was charged with 1 liter of absolute methanol, saturated with HCl gas (with cooling). To this was added 137 g p-aminobenzoic acid and the mixture was refluxed for 4 hours. The hot reaction mixture was poured into 2 liters of water and sodium carbonate was added until neutral. The white ester precipitated from the solution. The solid was filtered, and recrystalized from ethylether. — m.p. 114°–116° C.

II. A reaction flask was fitted with a stirrer, a thermometer and a condenser. The flask was charged with 55 g of 2-diethylamino-4,6-dichloro-s-triazine, 98 g methyl-p-aminobenzoate, and 68 g sodium carbonate in 1,000 ml toluene. The mixture was refluxed for 5 days and after cooling a white solid was obtained which was washed for with methanol and water, m.p. 209.5. The product was recrystalized from benzene and ethyl acetate. The yield was 84.4 g.

Analysis:
Calcd. for
$C_{19}H_{26}N_6O_4$: C:    61.33, H: 5.77,    N:    18.66,
Found:                      61.04     5.88           18.49

EXAMPLE 8

4,6-Bis(5'-carboxy-n-pentylamino)-2-diphenylamino-s-triazine

A mixture of 3.17 g of 4,6-dichloro-2-diphenylamino-s-triazine, 12.00 g of an aqueous solution containing 20 mole of sodium hydroxide and 20 m. mole of sodium-6-aminocaproate and 50 ml of water was heated at reflux for 5 hours. The resulting hot solution was filtered and acidified with 1 normal hydrochloric acid to pH 3. On standing overnight the product precipitated. It was filtered washed with water and dried by suction, yielding 4.52 g of the compound, m.p. 197°–198° C.

This product was recrystallized from 50 percent aqueous acetic acid with ice bath cooling, and dried yielding 3.80 g (81 percent) of the purified material having the m.p. 200° – 201° C.

Analysis:
Calcd. for
$C_{27}H_{34}N_6O_4$ (506.59)   C: 64.01   H: 6.76   N: 16.60
Found:                             63.93      6.85      16.55

EXAMPLE 9

2-Diphenylamino-4,6-bis(p-carbethoxyanilino)-s-triazine 3.17 g of 4,6-dichloro-2-diphenylamino-s-triazine, 3.63 g of ethyl-p-aminobenzoate, 4.24 g of sodium carbonate anhydrous powder and 125 ml of toluene were added to a reaction flask. The mixture was reflux for 22 hours. The mixture was filtered and the product was washed with hot toluene and then with hot distilled water. The product wad dried 4.96 g (Yield of 86 percent) of the compound, m.p. 230°–232° C. The product was dissolved in approximately 30 ml dioxane and 60 ml hot ethanol. The solution was cooled and the crystals which formed were filtered and washed with ethanol. The solid was dried yielding 4.0 g of the product having a m.p. 229° – 230° C.

Analysis:
Calcd. for
$C_{33}H_{30}N_6O_4$        C: 68.91   H: 5.26   N: 14.63
Found:                         68.92      5.33      14.60

EXAMPLE 10

4,6-Bis(m-carbomethoxyanilino)-2-diphenylamino-s-triazine 9.57 g of 4,6-dichloro-2-diphenylamino-s-triazine, 9.98 g of methyl-m-aminobenzoate, 10.6 g of sodium carbonate and 500 ml of toluene was placed in a reaction flask. The mixture was heated with stirring for 70 hours, and filtered hot. The solid obtained was washed with toluene and dried. The solid was recrystallized from ethanol, yielding 8.8 gm of the product with a m.p. of 191.5° – 192.5° C.

Analysis: Calcd. for
$C_{31}H_{26}N_6O_4$     C: 68.12   H: 4.80   N: 15.31
Found:                      67.87      4.83      15.42

EXAMPLE 11

4,6-Bis(p-carbophenoxyanilino)-2-diphenylamino-s-triazine 11.5 g of 2-diphenylamino-4,6-bis(p-carbethoxyanilino)-s-triazine, 47.0 g of phenol and 50.5 g of sodium methoxide was heated for 4 hours under $N_2$ atmosphere at 190°–200° C. After cooling the mixture was diluted with 200 ml of ether. The precipitate which formed was filtered and washed with ether. The product was dissolved in approximately 50 ml dioxane; 300 ml of methanol was added to the solution and a precipitate formed which was filtered and dried. The product was recrystallized from dioxane-methanol mixture and had a m.p. of 265° – 264° C.

Analysis:
Calcd. for
$C_{41}H_{30}N_8O_4$       C: 73.42     H: 4.52     N: 12.52
Found:                    72.95        4.85        12.63

EXAMPLE 12

4,6-Bis(5'-carboxy-n-pentylamino)-2-N-methylanilino-s-triazine

Into a reaction flask fitted with a mechanical stirrer and reflux condenser were added 51.0 g of 4,6-dichloro-2-N-methylanilino-s-triazine, 240 g of an aqueous solution which contained 0.4 mole of sodium hydroxide and 0.4 mole of sodium 6-amino-caproate and 1,000 ml of water. The suspension was heated to reflux temperature with stirring for about 16 hours. 3 g of charcoal was added to the hot mixture the mixture was filtered. After cooling, the alkaline solution was acidified with concentrated hydrochloric acid to pH3.

The precipitated material was filtered and washed with acetone. The product was recrystallized from 50 percent aqueous acetic acid, washed with acetone and dried, yielding 51.41 g of the product which had a m.p. of 167° – 168° C.

Analysis:
Calcd. for $C_{22}H_{33}N_6O_4$
           C: 59.44     H: 7.26     N: 18.91
Found:     59.44        7.19        18.94

EXAMPLE 13

Alternate procedure for the preparation of 2-N-methylamino-4,6-bis(5'-carboxy-n-pentylamino)-s-triazine 1. 4,6-Bis(5'-carboxy-n-pentylamino)-2-chloro-s-triazine 300 g of ice, 0.5 mole of sodium 6-aminocaproate and 0.5 mole of sodium hydroxide were added to 0.25 mole of solid cyanuric chloride. THe mixture was stirred and maintained at a temperature of about 4° C until most of the cyanuric chloride dissolved. The solution was then stirred for 16 hours at room temperature followed by heating at 50° C for 8 hours. 500 ml distilled water and 50 ml concentrated hydrochloric acid were added to the mixture. The mixture was filtered at room temperature and washed with water. The solid obtained was dried, yielding 75 g of the product with a m.p. of 177° – 178° C. After recrystallization from ethanol the product had a m.p. of 185° – 186° C.

Analysis:
Calcd for $C_{15}H_{24}ClN_5O_4$ (373.84)
           C: 48.19     H: 6.47     Cl 9.49    N: 18.73
Found:     48.05        6.40        9.16       18.61

2. 4,6-Bis(5'-carboxy-n-pentylamino)-2-N-methylanilino-s-triazine

A mixture of 7.48 g of 4,6-bis(5'-carboxy-n-pentylamino)-2-chloro-s-triazine, 4.28 g of N-methylaniline, 4.24 g of anhydrous sodium carbonate and 150 ml of water was heated at reflux for 16 hours. The excess methylaniline was steam distilled off and the remaining aqueous solution was cooled to room temperature, diluted with ice and water to ca 350 ml and then acidified to pH3 to 3.5 with 1 normal hydrochloric acid. After the product precipitated it was filtered, washed with water, then acetone and recrystallized from 50 percent aqueous acetic acid. The product was dried, yielding 4.26 g of the m.p. of 165°–168° C.

EXAMPLE 14

4,6-Bis(5'-carboxy-n-pentylamino)-2-diallylamino-s-triazine 74.76 g of 4,6-bis(5'-carboxy-n-pentylamino)-2-chloro-s-triazine, 53.0 g sodium carbonate and 900 ml of water was added to the reaction flask, under a nitrogen atmosphere. A solution of 33.4 g diallylamine hydrochloride in 100 ml of water was added through a dropping funnel. The mixture was stirred for 16 hours at reflux. The solution was acidified to a pH of 4 with concentrated hydrochloric acid. The mixture was diluted with 1.5 liters of distilled water and stirred 1 hour at room temperature. The mixture was filtered, and the solid obtained was washed with distilled water and dried. The product was recrystallized first from p-dioxane and then by dissolving the product in 500 ml water and 30 ml ammonium hydroxide. Concentrated hydrochloric acid was added to lower the pH to 4.5. The precipitate was filtered, washed first with water, and then with acetone. The product was dried and had a m.p. of 140° – 142° C.

Analysis:
Calcd for
$C_{21}H_{34}N_6O_4$:       C: 59.05,    H: 7.89,    N: 19.34
Found:                     57.65        7.92        19.45

EXAMPLE 15

4,6-Bis(5'-carboxy-n-pentylamino)-2-amino-s-triazine 4,6-Bis(5'-carboxy-n-pentylamino)-2-chloro-s-triazine, and 200 ml concentrated ammonium hydroxide where placed in a reaction flask, and ammonia gas was passed through the solution. The solution was heated at reflux for 16 hours. The product was isolated by making the solution acidic (pH 3) with concentrated hydrochloric acid. The product was filtered and washed with water. The solid was recrystallized from 50 percent aqueous acetic acid filtered and dried. The m.p. of the product was 223.5°–225° C.

Analysis:
Calcd for
$C_{15}H_{26}O_4N_6$ (354.41)   C: 50.80    H: 7.39    N: 23.71
Found:                          50.55       7.33       23.26

EXAMPLE 16

4,6-Bis[di(carboxymethyl)amino]-2-dimethylamino-s-triazine 96.5 g 4,6-dichloro-2-dimethylamino-s-triazine, 195.1 g iminodiacetic acid disodium salt monohydrate and 2,000 ml of water were placed into a reaction flask. The mixture was heated at reflux for 3 hours. The pH was maintained between 8.5 and 10.0 by addition of 50 percent sodium hydroxide solution. The solution was filtered hot and 187 ml of concentrated HCl was added. The solution was heated on a steam bath for 1 hour and upon cooling a precipitate formed which was filtered and dried. The product was recrystallized from dilute hydrochloric acid solution.

The weight of the product was 116.9 g.

Analysis:
Calcd. for
$C_{13}H_{18}N_6O_8$     C: 40.41     H: 4.70     N: 21.76
Found:                    40.18       4.63        21.58

EXAMPLE 17

4,6-Bis(3'-carboxy-n-propylamino)-2-dimethylamino-s-triazine 400 ml of water, 1 mole of sodium hydroxide, 1 mole of the sodium salt of 4-aminobutyric acid and 800 g of ice was placed in a flask with stirring. 96.5 g of 4,6-dichloro-2-dimethylamino-s-triazine was then added. The mixture was heated to reflux for 16 hours and after cooling the solution was filtered. The solution was heated to 50° C and acidified with hydrochloric acid to pH 1. A precipitate formed which was filtered, washed with distilled water and dried.

The weight of the product obtained was 116 g.

The sample was recrystallized twice from diethyl cellosolve and had a m.p. of 227°–227.5° C.

Analysis:
Calcd:     C: 47.84     H: 6.79     N: 25.75
Found:        47.53       6.84        24.83

What is claimed is:
1. A compound having the formula:

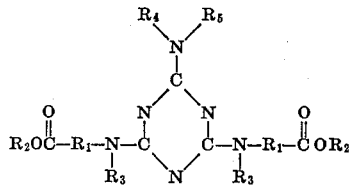

wherein
  $R_1$ is phenylene, alkylene of from one to ten carbon atoms or a cycloalkylene group of from five or six carbon atoms;
  $R_2$ is phenyl, lower alkyl or hydrogen;
  $R_3$ is hydrogen or alkylene moncarboxylic acid group of the formula $C_xH_{2x}COOH$ wherein $x$ has the value from 1 to 10; and
  $R_4$ and $R_5$ is the same or different and each is allyl, alkyl of from one to six carbon atoms, phenyl or cycloalkyl of from five to six carbon atoms.

2. A compound according to claim 1 wherein:
  $R_1$ is an ortho, meta or para phenylene group;
  $R_2$ is phenyl group;
  $R_3$ is hydrogen; and
  $R_4$ and $R_5$ are phenyl groups.

3. A compound according to claim 1 wherein:
  $R_1$ is an ortho, meta or para phenylene group;
  $R_2$ is ethyl group;
  $R_3$ is hydrogen; and
  $R_4$ and $R_5$ are phenyl groups.

4. A compound according to claim 1 wherein:
  $R_1$ is alkylene;
  $R_2$ and $R_3$ are hydrogen; and
  $R_4$ and $R_5$ are alkyl groups.

5. A compound according to claim 1 wherein:
  $R_1$ is decylene group;
  $R_2$ and $R_3$ are hydrogens; and
  $R_4$ and $R_5$ are methyl groups.

6. A compound according to claim 1 wherein:
  $R_1$ is pentylene group;
  $R_2$ and $R_3$ are hydrogens; and
  $R_4$ and $R_5$ are ethyl groups.

7. A compound according to claim 1 wherein:
  $R_1$ is pentylene group;
  $R_2$ and $R_3$ are hydrogens; and
  $R_4$ and $R_5$ are phenyl groups.

8. A compound according to claim 1 wherein:
  $R_1$ is methylene group;
  $R_2$ and $R_3$ are hydrogens; and
  $R_4$ and $R_5$ are methyl groups.

9. A compound according to claim 1 wherein:
  $R_1$ is propylene group;
  $R_2$ and $R_3$ are hydrogens; and
  $R_4$ and $R_5$ are methyl groups.

10. A compound according to claim 1 wherein:
  $R_1$ is pentylene group;
  $R_2$ and $R_3$ are hydrogens; and
  $R_4$ and $R_5$ are hydrogens.

11. A compound according to claim 1 wherein:
  $R_1$ is methylene group;
  $R_2$ is hydrogen;
  $R_3$ is methylene carboxylic acid group; and
  $R_4$ and $R_5$ are methyl groups.

12. A compound according to claim 1 wherein:
  $R_1$ is pentylene group;
  $R_2$ and $R_3$ are hydrogens; and
  $R_4$ and $R_5$ are allyl groups.

* * * * *